Patented Aug. 24, 1948

2,447,550

UNITED STATES PATENT OFFICE 2,447,550

FRUIT FLAVORED FOOD COMPOSITION

Alexander M. Zenzes, New York, N. Y., assignor of one-half to Musher Foundation, Incorporated, New York, N. Y., a corporation of New York No Drawing. Application December 14, 1942, Serial No. 468,998. In Mexico December 16, 1941

10 Claims. (Cl. 99—132)

This invention relates to the production of fruit flavored foods which are made particularly from cane juice and sugar compositions containing similar natural non-sugar impurities and less preferably from the sugar containing juices of other plants and various syrups including molasses or concentrates produced incidental to the refining of such sugars and particularly to the preparation of jellies and gums made therefrom.

The impurities of the water extract of the sugar cane are objectionable tasting substances. For example, cane juice as expressed from the sugar cane is objectionable in flavor, readily fermentable, and subject to rapid inversion of the sucrose which it contains. The residual impurities as are present in blackstrap molasses, for example, are very bitter tasting and also objectionable for use as foods. It has now been found by treating such sugar containing solutions at certain concentrations and at certain pH ranges and particularly with the addition of a relatively small quantity of pectin a change takes place in these objectionable tasting substances whereby they are converted into substances having a desirable palatable fruity taste in highly stable condition.

For example, by acid reacting to a pH of between 2.5 and 3.6 and desirably between 3.1 and 3.5, the objectionable flavors of the impurities of the sugar cane are converted into a highly desirable fruit flavor and surprisingly in spite of the very large amount of acid added, the sucrose and invert sugars retain a most agreeable sweetness without change of flavor and with perfect stability and keeping quality.

By this treatment, the objectionable tasting non-sugar impurities are acid reacted and modified to form highly desirable, stable, homogeneous, non-oxidizable fruit flavor complexes. By adding the pectin the stability and flavor of the product are further enhanced.

An object of the present invention is therefore to provide a stable, nonperishable, nonvolatile, non-oxidizable jelly or gum made from cane juice and sugar compositions containing similar natural non-sugar impurities in which the impurities of the sugar cane have been reacted to produce the highly desirable fruit flavored composition.

A further object is to provide a low cost, fruit flavored jelly or gum made from pure sugar cane constituents.

A further object is to convert the original impure sugar cane materials of low economic value and that may normally be discarded as waste into highly desirable, readily utilizable food compositions having great value.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with the present invention, cane juice which may have been defecated by treatment with lime or otherwise and which cane juice contains between 0.25% and 2.5% ash based upon total solids is acidified to between pH 2.5 and pH 3.6 and preferably to between pH 3.0 and pH 3.4, whereby a chemical reaction occurs between the non-sugar impurities of the cane juice and the added acid, and whereby a modification takes place in the objectionable tasting complexes changing them into highly desirable fruit aromas and flavors followed by concentration of the acid reacted cane juice.

This treatment which may require at least about 30 to 45 minutes to complete causes a reaction between the acid and the sugar cane impurities whereby the objectionable flavors of the sugar cane impurities are changed into a highly desirable fruit aroma and flavor which is non-volatile and non-oxidizable and which will withstand long boiling periods even at temperatures of 250° F. to 260° F.

The acid reacted or acid modified cane juice carrying the highly desirable fruit flavor may be concentrated to the desired Brix required to produce a jelly, for example, such as to 65 Brix at which time the pectin is added in properly dispersed form. The finished product at 65 Brix is then allowed to cool and jellify whereby a jelly is obtained having an enhanced fruit flavor and aroma which flavor and aromatic qualities are stable, non-volatile and non-oxidizable.

The cane juice utilized in accordance with the present invention may previously, where desired, have been defecated as by the use of lime or similar treatment. This cane juice is objectionable in flavor, readily fermentable and unstable whereas the modified cane juice of the present invention containing the fruit flavor complexes is a highly desirable stable product which is useful in the manufacture of many foods.

The type of fruit flavor obtained in the solid mass may be controlled by the degree and method of defecation of the cane juice. For example, where the product is made from highly defecated cane juice more of an apple type flavor is obtained in the final mass whereas when a non-defecated cane juice is used, more of a prune type flavor is obtained.

This is accomplished although the acid reacted juice or the jelly made therefrom is altogether devoid of the essential oils which are responsible for the apple or prune flavor normally contained in those materials.

The cane juice containing between 0.25% and 2.5% ash based upon total solids and preferably between 0.5% and 1.5% ash based upon total solids is first desirably modified by adding about one-half of the total acid required, following which the partially acid reacted cane juice is concentrated to at least about 65 Brix or to the desired concentration of total solids at which point the balance of the acid is added so as to increase the acidity to between pH 2.5 and 3.6

The pH adjustment between 2.5 and 3.6 appears to represent the critical limits, but preferably in order to obtain the most desirable results of the present invention the pH is adjusted to between pH 3.1 and pH 3.4, which acidity appears to complete the modification of the objectionable tasting materials and to give a highly desirable fruit aroma and flavor and which fruit flavor is further enhanced and improved by the subsequent addition of the small amount of pectin, and which fruit aroma and flavor are non-oxidizable, stable and nonvolatile even at temperatures of 250° F. to 260° F.

In the production of the novel fruit flavored jelly of the present invention there is desirably added to the cane juice half of the total acid required before concentration and the partially acid modified cane juice is then concentrated to about 75 Brix at which time there is added to this composition the desired amount of pectin to produce jellification of the finished product, which pectin has been previously dispersed in water or sugar syrup. The composition is then adjusted to the desired Brix, preferably 65 Brix at which time there is added the balance of the acid required to produce a pH of between 3.1 and 3.4. This product then may be poured into jars or molds and allowed to cool and jellify whereupon there is obtained the highly desirable fruit flavored stable product of the present invention.

Similar procedures can be followed in the preparation of gums where a higher concentration of solids is desired in the finished product.

There is desirably utilized for acidification of the cane juice the polycarboxylic aliphatic acids and including particularly the food acids such as tartaric acid, citric acid and malic acid and less preferably their acid salts. Among other acids that may less desirably be used are included lactic acid, glycollic acid and phosphoric acid and less desirably hydrochloric, sulphuric and similar acids or their various acid salts. Other acids which may be utilized are the dibasic acids such as succinic and malonic acid as well as the sugar acids such as gluconic acid and saccharic acid. The acids themselves should be free of noticeable flavor and are used for the sole purpose of reacting with the non-sugar impurities of cane juice in order to produce the fruit flavors of the present invention and the acids must be added in a sufficient quantity to produce the effective acidity in terms of pH concentration as indicated. It has not been found desirable, however, to use reducing acids of the nature of sulphurous acid or oxidizing acids such as nitric acid which appear to form objectionable constituents.

The amount of acid to be added is quite critical and it may be controlled in accordance with the ash content of the cane juice or similar sugar containing juice.

In order to obtain the desired nonvolatile fruit flavor and aroma it is necessary to add between about 25 and 200 parts and desirably between 75 and 150 parts of tartaric acid or its acid equivalent based upon the standard pH scale to each 100 parts of ash on total solids in the cane juice.

For example, to defecated cane juice containing 1.0% ash on total solids there is added between 0.75% and 1.5% and preferably an equal amount by weight of tartaric acid or its acid equivalent to obtain the desired pH and the desired fruit flavor.

In the production of the jelly or gum of the present invention there is desirably added to the cane juice composition 1 part of pectin to at least 0.75 to 2.5 parts of acid and preferably about 1.5 parts of acid, the amount of acid required being in turn determined critically by the ash content of the cane juice or similar sugar composition.

This acid requirement is greatly in excess of the amount of acid normally required to produce any other type of jelly.

The concentrated, acid reacted cane juice obtained by the procedures of the present invention assumes the character of a fruit with not characteristic whatsoever of the original cane juice or of any cane product or byproduct including raw sugar, refined sugar, and molasses.

The defecated cane juice in unconcentrated or concentrated condition or before or after acidification may, where desired, be filtered through bone char or charcoal where a lighter colored product is desired or, where clarification is desired, through diatomaceous earth or similar filtering medium.

As examples of the utilization of the present invention, the following may be noted:

*Example I*

1000 pounds of defecated cane juice which had been concentrated to 20 Brix was found to contain approximately 1% total ash based upon total solids.

There was prepared a solution containing 3 pounds tartaric acid in 3 pounds of water. To the cane juice of 20 Brix there was added 3 pounds of the 50% solution of tartaric acid. The partially acid reacted or modified cane juice containing one-half of the total acid was then concentrated to 50 Brix.

At this time the balance of 3 pounds of the 50% tartaric acid solution was added and the pH of this concentrated acid reacted cane juice was found to be pH 2.95. The product was then further concentrated to 68 Brix.

This product was found to have a highly desirable fruit aroma and flavor and even after boiling for extended periods of time or when the product was used in the production of other manufactured foods its natural fruit flavor was not lost or diminished.

*Example II*

1000 pounds of defecated cane juice which had been concentrated to 20 Brix was found to contain approximately 1.25% total ash based upon total solids.

There was prepared a solution containing 3 pounds of tartaric acid in 3 pounds of water. To the cane juice of 20 Brix there was added 3 pounds of the 50% solution of tartaric acid. The partially acid reacted or modified cane juice containing one-half of the total acid was then concentrated to 75 Brix. There was then prepared a pectin solution in which 2 pounds of pectin were prepared in the form of a 4.5% water solution and the pectin solution was then added to the cane juice composition with agitation.

This product was then concentrated to 65 Brix at which time the balance of 3 pounds of the 50% tartaric acid solution was added and the finished product was found to have a pH of 3.15.

The product was still in fluid condition and was poured into jars to allow to cool and "set."

The product obtained in accordance with the procedures of Example II was found to have an enhanced and improved fruit flavor and aroma which appeared to be even more emphasized than the product of Example I.

*Example III*

1000 pounds of defecated cane juice which had been concentrated to 20 Brix was found to contain approximately 1.25% total ash based upon total solids.

There was prepared a solution containing 3 pounds of tartaric acid in 3 pounds of water. To the cane juice of 20 Brix there was added 4.5 pounds of the 50% solution of tartaric acid. The partially acid reacted or modified cane juice containing three-quarters of the total acid was then concentrated to 75 Brix. There was then prepared a pectin solution in which 2 pounds of pectin were prepared in the form of a 4.5% water solution and the pectin solution was then added to the cane juice composition with agitation.

This product was then concentrated to 87.5 Brix at which time the balance of 1.5 pounds of the 50% tartaric acid solution was added and the finished product was found to have a pH of 3.15.

This product was still in fluid condition and did not immediately "set" so that there was sufficient time for it to be poured into molds and allowed to solidify to form a gum or concentrated jelly having a fine fruit aroma and flavor with a substantially firm body and gum-like structure.

It is particularly surprising to find that in accordance with the procedure outlined in Example III the product does not rapidly or prematurely "set" without giving time to place in molds as is normally encountered in the preparation of the usual type of concentrated jellies. Under normal conditions where a jelly is made from a fruit juice and sugar, for example, there is insufficient time available to place the finished product into molds and the product goes from a liquid state into a gel almost instantaneously. On the other hand, in accordance with the procedure of the present invention, the "setting" is naturally retarded and sufficient time is afforded for the proper packaging and handling of the finished product.

The products of the present invention have been found of great value in the production of a wide variety of foods such as in the manufacture of jellies and gums for confectionery purposes, in the bakery industry, for beverages and soft drinks, in the preparation of alcoholic beverages or cordials, for ice cream, sherbets or ices, and for similar food compositions.

Furthermore, in accordance with the present invention, the amount of acid that is added is very substantially in excess of that which would enable one otherwise to produce a satisfactory product such as is required in the preparation of an ordinary fruit jelly. The acid that is added in accordance with the present invention is five to eight times or more that which it would be possible to add with any pectin solution in the preparation of a standard fruit jelly without damaging the normal jelly structure.

Furthermore, by the addition of this excessive amount of acid which desirably amounts to 2 parts of tartaric acid or its acid equivalent, for example, and 1 part of pectin and 1 part of ash, there results a reaction to, first of all, produce the fruit flavor that is so highly desirable and, secondly, obtain proper jellification notwithstanding this high acid treatment.

Normally, in the preparation of a fruit jelly, for example, with each 1 part of pectin there is added not over about ¼ part to ⅓ part of tartaric acid or its acid equivalent. If the amount of acid is in excess of this ⅓ part, then the jelly does not form satisfactorily, the pH level being too low.

In accordance with the procedures of the present invention, however, there is added between 4 and 12 times the amount of acid that would be normally required to produce a standard fruit jelly and in spite of this high amount of acid added, the pH is then within the desired range of about 3.1 to 3.4 and a satisfactory jelly may be produced.

Strangely, the fruit characteristics of the acid reacted cane juice appears to be a combination of currant, wild raspberry and prune with the objectionable characteristics of the cane juice entirely gone. Where defecated cane juice is utilized, more of an apple flavor and a lighter colored product is obtained. The ash content of the cane juice or similar composition should not exceed 2.5%, and desirably is in the range of 0.5% to 1.5%.

The ash content may, however, be adjusted by blending or admixture with other intermediate sugar products or sugar residues or by the addition of sucrose or other sweetening agents in order to reach the desired ash content.

For example, if a nondefecated cane juice is used and if that cane juice contains an excessive quantity of ash as, for example, 3.5%, then it is desirable to add an additional amount of sucrose or other sweetening agent in order to reduce the ash content to the desired point which will produce the fruit flavor and which is desirably between about 0.5% and 1.5% total ash based upon total solids.

It has been found that where the cane juice has been subjected to treatment with sulphur dioxide or sulphurous acid, the acid reaction of the present invention appears to be inhibited and the fully desirable results of the present invention are not obtained.

Of particular importance is the fact that these novel flavors are produced in substantially nonvolatile condition so that when used in the manufacture of other foods where additional concentration or boiling is employed, the aromatic constituents and flavor complexes are not volatilized but are fully retained.

The nonvolatile character of the fruit flavor obtained in accordance with the present invention is of particular importance for all food products where high temperature treatment is involved particularly in the manufacture of the so-called confectionery gums.

These gums are now limited to the use of artificial flavoring ingredients which artificial flavors, consisting principally of essential oils, are added at the close of the boiling treatment because of their high volatility. The natural fruit juices do not withstand the high and prolonged cooking temperatures to which the confectionery gums are subjected and therefore the natural fruits and fruit juices are not used in the production of the confectionery gums.

However, in accordance with the procedures of the present invention the cane juice or similar composition may very readily be employed in the production of these confectionery gums since prolonged and high temperature cooking does not appear to affect their intensity or desirability of fruit flavor and the finished confectionery gum or similar product which has been subjected to extensive and prolonged high temperature treatment will retain its natural desirable fruit flavor.

Furthermore, in accordance with the present invention, a product of concentrated food value is obtained, which product although in acid condition reverts to an alkaline condition upon ingestion, and there are retained the natural vitamin values, minerals and other constituents originally present in the cane juice although in reacted form.

One of the most desirable features of the present invention is that the product of the present invention will greatly enhance and support other fruit flavors and serves as a better base for all fruit flavors since with less addition of flavor, a stronger flavor is obtained.

For example, the addition of only about ¼ to 1/10 the amount of peaches or peach flavor or cherries or cherry flavor is required when used in combination with the cane juice composition of the present invention to give the same intensity of flavor and aroma as would normally be required by the full quantity of peaches or cherries. This is of great importance in connection with the manufacture of jellies, and also in the production of canned fruits, fruit syrups, and fruit juices.

Furthermore, when the products of the present invention are utilized in this manner they will contain no artificial flavor, coloring matter or preservative and are high in intrinsic food value so that by the procedures of the present invention a product of low economic value and containing materials that are normally converted into waste products is changed into materials of high economic value.

One of the most unusual characteristics of the products produced in accordance with the present invention is that the flavors are nonoxidizable and will retain their original flavor and aroma characteristics over long periods of time without change or diminution.

Whereas normally the flavors in food products are very readily oxidizable so that upon exposure to air or light or upon storage they lose their natural flavor characteristics or they develop objectionable flavor characteristics; or whereas other food products having certain aromas and flavors contain the aromas and flavors in the form of highly volatile essential oils, the products of the present invention have flavors which are nonoxidizable and substantially non-volatile.

For example, the products made in accordance with the present invention may be boiled over long periods of time or carried at elevated temperatures without loss or diminution of their natural flavors or they may be stored for a period of two or more years even under conditions of relatively high temperature and humidity or upon exposure to light and the flavors are still retained.

Together with or in lieu of the cane juice, it has also been found possible to utilize in accordance with the present invention raw sugars and brown sugars, sometimes referred to as soft sugars, provided that the ash content amounts to or has been adjusted to between 0.25% and 2.5% total ash based upon total solids and desirably to between the preferred proportions of 0.5% and 1.5%.

Where the ash content of these raw sugars or soft sugars must be adjusted to come within the critical ash limits, or where raw sugars or soft sugars are utilized, the non-sugar impurities must also resemble qualitatively the non-sugar impurities of the original cane juice. If during the refining processes or by using combinations of sugars with intermediate products the non-sugar impurities no longer resemble qualitatively the non-sugar impurities of the cane juice as, for example, if an excess amount of soluble salts has been introduced during the refining processes through the introduction of refining media so as to change the qualitative resemblance of these non-sugar impurities, then the desired products of the present invention are not obtained and even though the quantitative critical limits may be reached, the qualitative critical limits have not been satisfied.

Together with or in lieu of the cane juice, there may also be utilized other sugar cane products containing between 0.25% and 2.5% ash and desirably between 0.5% and 1.5% ash based upon total solids and which ash qualitatively resembles substantially the ash of cane juice.

For example, a combination may be prepared comprising refiners syrup or molasses and which has an ash content of 6%, for example, and other sweetening agents such as a sucrose or other crystallizable sugars in order to reduce the ash content to the desired level which is preferably between 0.5% and 1.5%.

The non-sugar impurities must also resemble qualitatively the non-sugar impurities of cane juice. Furthermore, the acid must be added in a sufficient excess quantity to produce a pH of between 2.5 and 3.6 and which will require between 0.75 and 2 parts of tartaric acid or its acid equivalent to each 100 parts of ash based upon total solids.

Together with or in lieu of the cane juice or similar cane material, it is also possible although less preferable to use other sugar juices or sugar products containing natural non-sugar impurities which are produced from the sugar beet and sorghum and less preferably from maple and other sugar bearing plants, and which products may be used in any of the above described manners.

Particularly in the case of beet juice or beet molasses combinations with sweetening agents or intermediate beet sugar products, it has been found desirable at some stage in the processing and preferably in the treatment of the original juice before or after defecation to place the beet material through charcoal, bone char or subject it to similar treatment. The beet juice or similar composition must, however, contain between 0.25% and 2.5% total ash and desirably between 0.5% and 1.5% total ash and furthermore the non-sugar impurities of this beet composition must also resemble qualitatively the non-sugar impurities as substantially contained in the original beet juice.

There are also included combinations of intermediate sugar products such as cane molasses or massecuites which combinations have been obtained by the addition thereto of sucrose or other sweetening agents to produce the same quantitative and qualitative non-sugar impurities as are present in the original juice such as the cane juice. The ash content, however, must be maintained at a point between 0.25% and 2.5% and desirably between 0.5% and 1.5%.

Where cane juice is used as the most desirable product of the present invention, the cane juice includes the product in solidified, dilute or syrupy condition, which may, where desired, have been defecated.

The term "pectin" as used herein is understood to mean pectin of definite graded strength. However, with suitable modifications it also includes pectic acid and the pectins of varying degrees of de-methoxylation.

The term "ash" is used herein to describe those products made from the non-sugar impurities which are left upon ultimate combustion.

Having described my invention, what I claim is:

1. A fruit flavored, stable, jellified food composition, said composition being derived from a raw juice selected from the group consisting of cane juice, beet juice and sorghum juice, said juice being expressed directly from cane, sugar beet and sorghum and containing its ash forming ingredients and said composition having an ash content of between 0.25% and 2.5% based upon total solids, said composition having a pH of between 2.5 and 3.6 and said composition containing a pectin as the jellifying agent, said ash content in said juice having been reacted with a food acid selected from the group consisting of tartaric acid, citric acid, malic acid, lactic acid, glycolic acid and phosphoric acid, between about 25 to 200 parts by weight of said food acid being reacted with each 100 parts by weight of ash.

2. A process of making a novel food product which comprises defecating a raw cane juice, concentrating the said juice to 20 Brix and adjusting the non-sugar ash-forming solids content of said cane juice so that it will have approximately 1% total ash, adding a small proportion of a 50% solution of tartaric acid to cause reaction between the total non-sugar solids and said tartaric acid, further concentrating the cane juice to 50 Brix, adding a further small quantity of a 50% solution of tartaric acid and adjusting the pH of the concentrated cane juice to about 2.95 and then further concentrating to 68 Brix.

3. A process of making a highly desirable, fruit flavored, jellified, high sucrose food composition which comprises defecating raw cane puice, concentrating the cane juice to about 20 Brix to approximately 1.25% ash content, adding an aqueous solution of tartaric acid in the proportion of about 0.15% of tartaric acid, further concentrating the cane juice to about 75 Brix, adding a pectin solution with agitation and then further concentrating to about 65 Brix and adding additional tartaric acid to adjust the pH to about 3.15 and finally permitting the solution to cool and set.

4. A process of making a highly desirable, fruit flavored, jellified, high sucrose containing food composition which comprises defecating raw cane juice, partly concentrating said cane juice, adding a dilute solution of a food acid selected from the group consisting of tartaric acid, citric acid, malic acid, lactic acid, glycolic acid and phosphoric acid, further concentrating the said cane juice, adding a dilute pectin solution thereto, again concentrating the said cane juice, adding a further amount of said food acid, placing said solution in molds and permitting it to set.

5. A process of producing a fruit flavor in cane sugar, which comprises defecating raw cane juice containing about 0.25% to 2.5% of ash based upon total solids, regulating the pH of said raw cane juice to 2.5 to 3.6 by adding thereto a food acid selected from the group consisting of tartaric acid, citric acid, malic acid, lactic acid, glycolic acid and phosphoric acid, maintaining this pH for a period of about 30 to 45 minutes to assure complete reaction between the ash forming solids in the raw cane juice and the food acid, whereby the objectionable flavors of the ash forming solids are changed into a highly desirable fruit aroma and flavor which are non-volatile and non-oxidizable and which will withstand long boiling periods even at temperatures of 250° F. to 260° F., and concentrating to about 65° Brix.

6. A process of improving the flavor of raw cane sugar which comprises providing a raw cane juice containing 0.25% to 2.5% of ash based upon total solids, reacting the ash forming ingredients in the raw cane juice for a period of about 30 to 45 minutes with between about 25 to 200 parts by weight of tartaric acid to every 100 parts by weight of ash and then concentrating, whereby there is produced by reason of the reaction between the tartaric acid and the ash forming impurities a highly desirable fruit aroma and flavor which is non-volatile and non-oxidizable and which will withstand long boiling periods even at temperatures of 250° F. to 260° F.

7. A process of producing highly desirable fruit aromas and flavors in raw cane juice products from the objectionable and bitter ash-forming ingredients therein which comprises providing a raw cane juice with 0.25% to 2.5% of ash based upon total solids, adding 0.75% to 1.5% of tartaric acid to each 1% of ash by weight based upon total solids and permitting said tartaric acid to react with the ash for a period of 30 to 45 minutes and then concentrating to 65° Brix whereby the objectionable flavors of the ash-forming ingredients are changed into a highly desirable fruit aroma and flavor which is non-volatile and non-oxidizable and which will withstand long boiling periods even at temperatures of 250° F. to 260° F.

8. A fruit flavored, stable, jellified food composition derived from raw cane juice, said juice being expressed directly from sugar cane and containing its ash forming ingredients and said composition having an ash content of between 0.25% and 2.5% based upon total solids, said composition having a pH of between 2.5 and 3.6 and said composition containing a pectin as the jellifying agent, said ash content in said juice having been reacted with a food acid selected from the group consisting of tartaric acid, citric acid, malic acid, lactic acid, glycolic acid and phosphoric acid.

9. A fruit flavored, stable, jellified food composition, derived from raw beet juice, said juice being expressed directly from sugar beets and containing its ash forming ingredients and said composition having an ash content of between 0.25% and 2.5% based upon total solids, said composition having a pH of between 2.5 and 3.6 and said composition containing a pectin as the jellifying agent, said ash content in said juice having been reacted with a food acid selected from the group consisting of tartaric acid, citric acid, malic acid, lactic acid, glycolic acid and phosphoric acid.

10. A fruit flavored, stable, jellified food composition derived from raw sorghum juice, said juice being expressed directly from sorghum and containing its ash forming ingredients and said composition having an ash content of between 0.25% and 2.5% based upon total solids, said composition having a pH of between 2.5 and 3.6 and said composition containing a pectin as the jellifying agent, said ash content in said juice having been reacted with a food acid selected from the group consisting of tartaric acid, citric acid, malic acid, lactic acid, glycolic acid and phosphoric acid.

ALEXANDER M. ZENZES.

REFERENCES CITED

The following references are of record in the file of this patent:

UNITED STATES PATENTS

| Number | Name | Date |
| --- | --- | --- |
| 1,182,517 | Whitaker | May 9, 1916 |
| 1,532,271 | Slay | Apr. 7, 1925 |
| 1,580,665 | Gusmer | Apr. 13, 1926 |

OTHER REFERENCES

Farmers' Bulletin No. 1241, "An improved method of making sugar-beet sirup," G. P. O. 1921, pp. 15, 16.